United States Patent [19]

Stone et al.

[11] Patent Number: 5,300,908

[45] Date of Patent: Apr. 5, 1994

[54] HIGH SPEED SOLENOID

[75] Inventors: Richard S. Stone, Milwaukee; George F. Jambor, Cedarburg, both of Wis.

[73] Assignees: Brady USA, Inc., Milwaukee, Wis.; Deltrol Corp., Bellwood, Ill. ; a part interest .

[21] Appl. No.: 595,144

[22] Filed: Oct. 10, 1990

[51] Int. Cl.$^5$ ............................ H01F 3/00; H01F 7/08
[52] U.S. Cl. .................................. 335/256; 335/236; 335/257; 335/258; 335/261; 335/262; 335/273; 335/277; 335/279
[58] Field of Search ............... 335/255, 256, 257, 262, 335/266, 268, 236, 258, 261, 273, 277, 279; 29/515–520, 602.1; 400/124; 101/93.05, 93.29–93.34; 251/129.18

[56] References Cited

U.S. PATENT DOCUMENTS

| | | | |
|---|---|---|---|
| 2,151,213 | 3/1939 | Kelley | 175/341 |
| 2,690,529 | 9/1954 | Lindblad | 335/266 |
| 2,967,983 | 1/1961 | Danklefs | 335/256 |
| 3,248,499 | 4/1966 | Young | 335/256 |
| 3,460,081 | 8/1969 | Tillman | 335/234 |
| 3,514,674 | 5/1970 | Toshio et al. | 317/155.5 |
| 3,784,943 | 1/1974 | Markowitz et al. | 335/266 |
| 3,827,426 | 8/1974 | Page et al. . | |
| 3,842,440 | 10/1974 | Karlson . | |
| 3,850,278 | 11/1974 | Mihm et al. | 335/255 |
| 3,874,002 | 4/1975 | Kurpanek . | |
| 3,919,722 | 11/1975 | Harmison . | |
| 4,028,572 | 6/1977 | Baltisberger . | |
| 4,044,324 | 8/1977 | Coors | 335/251 |
| 4,137,513 | 1/1979 | Reece | 335/219 |
| 4,166,314 | 9/1979 | Rekewitz et al. | 29/517 |
| 4,211,496 | 7/1980 | Naylor | 335/255 |
| 4,213,207 | 7/1980 | Wilson . | |
| 4,243,899 | 1/1981 | Jaffe . | |
| 4,253,493 | 3/1981 | English | 335/266 |
| 4,259,653 | 3/1981 | McGonigal . | |
| 4,306,207 | 12/1981 | Tada et al. . | |
| 4,383,234 | 5/1983 | Yatsushiro et al. . | |
| 4,422,060 | 12/1983 | Matsumoto et al. | 335/262 |
| 4,468,177 | 8/1984 | Strimling . | |
| 4,479,162 | 10/1984 | Offutt et al. | 335/266 |
| 4,486,728 | 12/1984 | Hastings | 335/256 |
| 4,547,911 | 10/1985 | Strimling . | |
| 4,557,673 | 12/1985 | Chen et al. . | |
| 4,578,077 | 3/1986 | Joh . | |

(List continued on next page.)

OTHER PUBLICATIONS

International Search Report from PCT Application PCT/US90/00264, and cited prior art.
2nd International Preliminary Examination Report, Apr. 3, 1991 (along with amendment to which the report refers).
Page 20 of Deltrol Controls Solenoid Brochure, FIG. 12. Brochure has no date. Is identified as "Engineering Specifications No. 1140–1." A copy is furnished herewith.

*Primary Examiner*—Leo P. Picard
*Assistant Examiner*—Raymond Barrera
*Attorney, Agent, or Firm*—Quarles & Brady

[57] ABSTRACT

A high-speed impact hammer type solenoid capable of operating at high speed such as 500 to 1000 strokes per second and with a relatively long stroke length. It is housed in a cylindrical shell and includes two separate coils and magnetic circuits operating on a single short plunger. The plunger is driven magnetically in both directions. The short plunger has reduced mass. This is made possible by elongated backstops extending through the coils to the plunger and by a flux washer extending from the shell to the plunger. Close control of the plunger stroke is achieved by a non-magnetic sleeve surrounding the plunger and spacing the backstops which are screw threaded into the shell. Resilient anti-residual pads on each side of the plunger absorb the impact of the plunger with the backstop, start the plunger in the opposite direction and speed up the decay of the magnetic field.

14 Claims, 2 Drawing Sheets

U.S. PATENT DOCUMENTS

| | | |
|---|---|---|
| 4,581,018 | 4/1986 | Jassawalla et al. . |
| 4,583,085 | 4/1986 | Beller .................................. 340/618 |
| 4,602,180 | 7/1986 | Olson . |
| 4,632,155 | 12/1986 | Maina .................................. 139/452 |
| 4,661,187 | 4/1987 | Beasley . |
| 4,668,459 | 5/1987 | Joh . |
| 4,682,135 | 7/1987 | Yamakawa ............................ 335/256 |
| 4,704,591 | 11/1987 | Hafner . |
| 4,707,315 | 11/1987 | Joh et al. . |
| 4,708,836 | 11/1987 | Gain . |
| 4,731,076 | 3/1988 | Noon et al. . |
| 4,735,752 | 4/1988 | Negethon, Jr. . |
| 4,735,754 | 4/1988 | Buckner . |
| 4,741,365 | 5/1988 | Van Ornum ..................... 137/625.65 |
| 4,751,487 | 3/1987 | Green .................................. 335/234 |
| 4,752,229 | 6/1988 | Clingerman et al. . |
| 4,779,582 | 10/1988 | Lequesne ........................ 123/90.11 |
| 4,786,240 | 11/1988 | Koroly et al. . |
| 4,835,503 | 5/1989 | Everett . |
| 4,855,702 | 8/1989 | Swanson et al. ..................... 335/262 |
| 4,859,975 | 8/1989 | Uetsuhara . |
| 4,905,961 | 3/1990 | Ichihashi et al. .................... 335/262 |

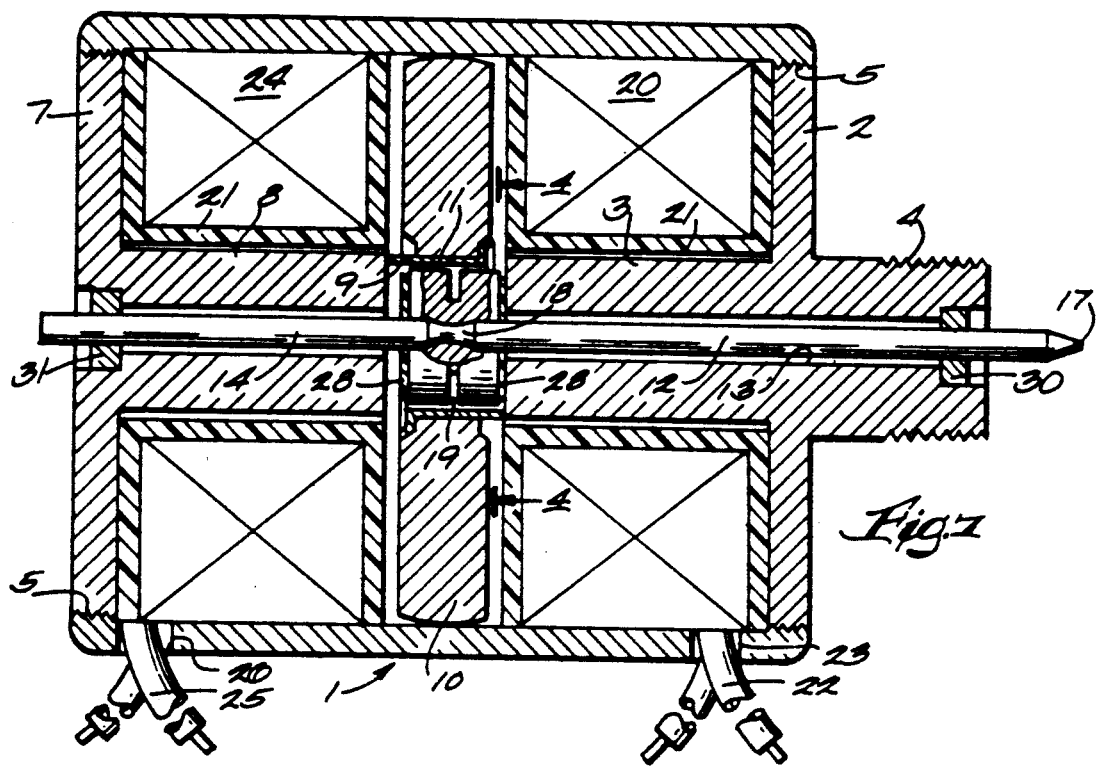

HIGH SPEED SOLENOID

BACKGROUND OF THE INVENTION

This invention relates to solenoids and more particularly to solenoids providing impact hammer type operation for use in industries such as matrix printing and signmaking. There has been an unsatisfied demand for higher and higher speeds in this type of equipment.

SUMMARY OF THE INVENTION

The primary object of the invention is to provide an impact hammer solenoid that follows external control signals at substantially higher speeds and at a longer stroke than prior art devices.

This is achieved by positively driving a plunger in both directions by magnetic force instead of using a return spring as in prior art devices. Two separate coils wound on separate bobbins are mounted at the ends of a cylindrical shell and are separated by a thick magnetic flux washer between the shell and plunger. This washer carries the flux for both coils, resulting in the plunger being driven in one direction when one coil is energized and in the opposite direction when the other coil is energized.

The invention also features long backstops at both ends of the shell, these backstops providing a space for a short plunger near the flux washer, the length of this plunger being about equal to or shorter than its diameter. The reduced mass allows the plunger to operate at high speeds. This speed is increased by anti-residual pads of non-magnetic material at both ends of the plunger. These pads absorb the shock and their resiliency provides a bounce starting the plunger in the opposite direction. The pads being non-magnetic also act as an air gap between the plunger and backstop which speeds the decay of the magnetic field. This further increases the possible operating frequency of the plunger.

Consistent operation of the solenoid is enhanced by accuracy in setting the plunger stroke. The invention includes a non-magnetic sleeve surrounding the plunger and serving as a spacer between the backstops.

BRIEF DESCRIPTION OF THE DRAWING

FIG. 2 is a perspective view, with a portion broken away, showing the first step in the attachment of the solenoid plunger onto the push-pull rod.

FIG. 3 is a perspective view similar to FIG. 2 illustrating attachment of the solenoid plunger onto the push-pull rod.

FIG. 4 is a front view of the flux washer shown in FIG. 1.

FIG. 5 is an elevation of the drive end of the solenoid of FIG. 1.

FIG. 7 is a sectional view similar to FIG. 1 but showing an alternative bearing arrangement for the solenoid plunger.

DETAILED DESCRIPTION

Figure 1:
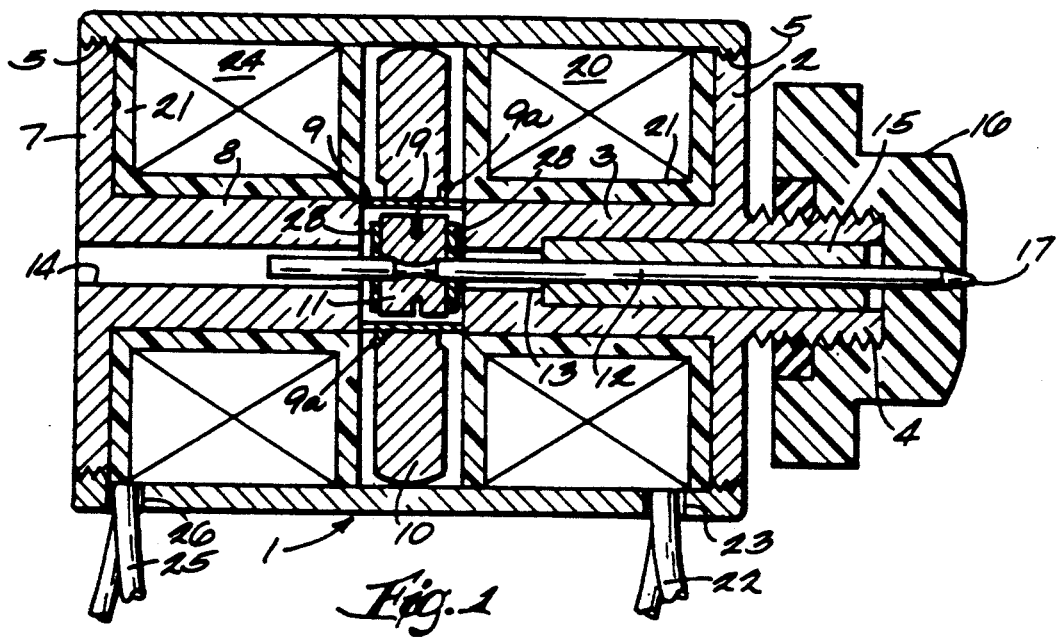
FIG. 1 is a side elevation partly in section of a solenoid embodying the invention.

Referring to FIGS. 1 and 2, reference character 1 indicates a cylindrical shell or frame of a magnetic core means which is closed at its right hand end by a disc 2 carrying an elongated circular drive end backstop 3 at its center. This backstop extends inwardly to a point near the center of shell 1. Disc 2 is also formed with a screw threaded mounting hub 4 on its outside for a purpose described below. The disc 2 is fastened to the shell 1 by external screw threads 5 which fit into internal screw threads at the end of the shell. Spanner wrench holes 6 are formed in disc 2 (FIG. 5) for tightening the disc in the shell.

The left hand end of the shell 1 is closed by disc 7 screw threaded into the shell. Disc 7 supports an elongated return end circular backstop 8 extending to a point near the center of the shell.

The ends of the backstops 3 and 8 are accurately spaced by a non-magnetic stainless steel sleeve 9 supported by a flux washer 10 at the center of shell 1. This flux washer engages the interior of shell 1 and is attached to the sleeve so that the sleeve properly locates the flux washer in the shell. In the exemplary construction, tabs 9a (FIG. 4) are bent outwardly from the sleeve and seat in an annular groove 10a along each round end surface of the washer; two tabs 9a are bent out from each end of the sleeve in this fashion and engage each end surface of the washer to firmly attach sleeve 9 to flux washer 10.

In the space between the ends of backstops 3 and 8 and inside of sleeve 9 is a short round solenoid plunger 11 carried by a hardened stainless steel push-pull rod 12. This rod extends through oversize holes 13 and 14 in backstops 3 and 8 and is supported by an elongated bearing 15 supported in the backstop 3 and hub 4 of disc 2. The bearing may be made of recognized bearing material such as 660 bearing bronze. The sleeve 9 is larger than the plunger providing an air space allowing free axial movement of the plunger. The push-pull rod 12 extends beyond the mounting hub 4 and is formed with an end having a radius 17 which does the work for the solenoid. Nut 16 is threaded onto hub 4 and can be adjusted to control the length of rod 12 that extends beyond the nut.

Plunger 11 is to be securely mounted on push-pull rod 12, and FIGS. 2 and 3 illustrate a presently-preferred construction for this purpose. Rod 12 is formed with a radiused groove 18, and plunger 11 is formed with a circumferential groove 19. Plunger 11 and rod 12 are placed in a suitable die, not shown, with the plunger located to surround groove 18 of the rod, following which pressure is applied axially against the plunger as shown by the arrows in FIG. 3 to swage the plunger onto the rod. Plunger 11 is of ductile metal, and part of the plunger flows into groove 18 of rod 12 while groove 19 closes either completely or partially (as shown) when pressure is applied, thereby mounting the plunger onto the rod.

Mounted over backstop 3 is a coil means 20 wound on a moulded bobbin 21 and having external leads 22 extending through a slot 23 formed in shell 1. An identical coil 24, also wound on a bobbin 21, is fitted over backstop 8 and has external leads 25 extending through slot 26 in shell 1. The current flow in coil 20 is opposite in direction to the current flow in coil 24 so as to cause a reversal of magnetic flux and thereby provide a more rapid change of the forces on push-pull rod 12 described next.

As shown in FIG. 4, the flux washer 10 is formed with a slot 27 to stop eddy currents. This flux washer, shell 1, backstops 3 and 8 and plunger 11 are preferably formed of silicon iron "A" or "B" FM grade annealed and thus carry magnetic flux. When coil 20 is energized a magnetic flux circuit is established through shell 1, backstop member 2-3, plunger 11, and flux washer 10 back to shell 1. This pulls the plunger and push-pull rod to the right in the direction of coil 20. Coil 20 is then de-energized and the plunger and rod are allowed to coast. When coil 24 is energized a magnetic flux circuit is established through shell 1, backstop member 7-8, plunger 11 and flux washer 10 back to shell 1. This pulls the plunger to the left in the direction of coil 24. Coil 24 is then de-energized and the plunger and rod are allowed to coast. It should be noted that flux washer 10 is in both magnetic flux circuits.

Figure 6:
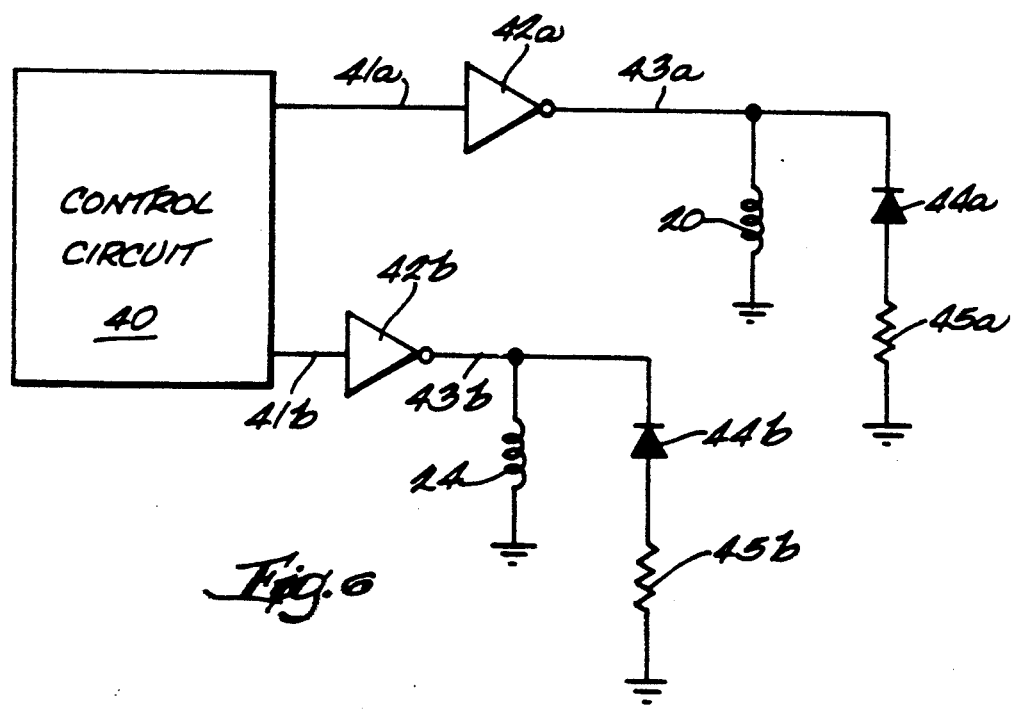
FIG. 6 is a schematic wiring diagram.

In use the coils are energized alternately, with an off time before the other coil is energized, as schematically shown in FIG. 6 at a high rate such as in the range of about 500 to 1,000 cycles per second, causing the plunger and rod to cycle at this high speed. The off time allows the rod to coast and permits a long stroke without burning up the coils or destroying components of the solenoid. For example, rod stroke lengths in the range of about 0.015" to 0.030" are possible with the solenoid of the present invention.

In the exemplary circuit means of FIG. 6, a control circuit 40, which may include, for example, a microprocessor or other logic circuit, is used to generate logic command signals 41a and 41b for selectively energizing the coil 20 and coil 24, respectively, The logic command signals 41a and 41b are amplified by buffer amplifiers 42a and 42b, with the output of buffer amplifier 42a on line 43a being applied to the coil 20 and the output of buffer amplifier 42b on line 43b being applied to coil 24. The buffer ampliers 42a and 42b provide both current gain and voltage level translation, having logic inputs compatible with the logic command signals 41a and 41b, and with high voltage, high current outputs suitable for driving the coils 20 and 24. Diodes 44a and 44b are connected in series with resistors 45a and 45b to form snubber networks for the inductive reverse voltage spike produced when the coils 20 and 24 are switched off, respectively. Specifically, the series combination of diode 44a and resistor 45a is connected in parallel with coil 20, while the series combination of diode 44b and resistor 45b is connected in parallel with coil 24. The number of turns and wire gauge used to form the coils 20 and 24 are selected for the desired speed and force of operation, as should be apparent to those skilled in the art. In a specific version of the circuit means of FIG. 6 for a signmaking machine, the logic command signals 41a and 41b were generated in an interleaved fashion to energize one coil for 550 microseconds, de-energize both coils for 500 microseconds, energize the other coil for 550 microseconds, and de-energize both coils for 500 microseconds; this provided high speed operation of coils 20 and 24 at an up/down cycle rate of approximately 500 cycles per second. In the exemplary embodiment, the drive amplifiers apply a voltage of +24 volts when energized, resulting in a self-inductance limited, exponential rise in coil current to a peak value of approximately 6 amps in approximately 550 microseconds. Peak coil current is therefore limited by the short "on" time with respect to the self-inductance of each coil 20 and 24, while the average coil current is limited by the relatively low (e.g. 25%) duty cycle for each individual coil 20 and 24.

An important part of the invention making this high speed possible are the anti-residual pads 28 at each end of the plunger 11. These pads may be formed of a thin tough resilient non-magnetic plastic film material or non-magnetic Belleville washers.. The preferred materials for plastic film pads are polyvinylidene chloride film such as that available from duPont under its registered trademark KYNAR and polyurethane films. Each pad 28 is in the form of a round washer-like element of plastic film having a central aperture through which the push-pull rod 12 is inserted; the pads are not fixed in place on either plunger 11 or rod 12. These pads are about 0.010" thick and have 3 functions as follows:

1. To absorb the impact of the plunger against the backstop.
2. To use their resiliency to "kick-off" the plunger in the reverse direction.
3. To provide the equivalent of an air gap between the plunger and backstop which speeds the decay of the magnetic field.

This high speed impacting requires periodic replacement of the anti-residual pads 28. To make this replacement easy, the end discs 2 and 7 are formed with external screw threads 5 mating with internal threads on the shell. Thus the solenoid may be quickly taken apart, pads replaced and reassembled.

This screw thread construction also provides for close control of the plunger stroke. When the backstops 3 and 8 are tightened against sleeve 9 the only variation in plunger stroke is in the tolerances of the lengths of the sleeve and the plunger and the thickness of the anti-residual pads. It is easy to hold the total variation in stroke within 0.006 inch.

FIG. 7 shows an alternative bearing arrangement. The parts are the same as in FIG. 1 except that bearing 15 is replaced by bearings 30 and 31 mounted in discs 2 and 7, respectively. Bearings 30 and 31 also can be of 660 bearing bronze.

From the foregoing it will be seen that the invention provides a new solenoid construction having an extremely high speed and relatively long stroke of operation. This is achieved in part by a short low mass plunger made possible by elongated backstops, by the use of a drive coil and a return coil separated by a thick flux washer, and by thin resilient non-magnetic pads on both sides of the plunger.

We claim:

1. In a high speed impact solenoid, the combination of, a short low mass plunger having two ends, magnetic means affecting said plunger, said magnetic means including two coils arranged end to end surrounding the plunger, said coils having inner ends facing each other and outer ends facing away and arranged to allow longitudinal movement of the plunger, said magnetic means also including frame means of substantially uniform magnetic permeability supporting said coils, said frame means extending the length of both coils and having transverse end sections facing the outer ends of the coils, said magnetic means also including permeable magnetic flux transmitting means between the coils, said flux transmitting means extending from closely adjacent the plunger to said frame means and being substantially thicker than said transverse sections, high frequency switching means controlling said coils in a manner to move the plunger magnetically alternatively in opposite directions at high frequency, a plunger shaft attached to the plunger and mounted for axial movement inside the frame means, said shaft being substantially smaller in diameter than the plunger and transferring motion of the plunger to outside said frame means, said magnetic means including elongated backstops at each end of the plunger extending toward the plunger, the length of the backstop providing an effective operating space between them for a short low mass plunger having a length aproximateingly its diameter, the low mass of the plunger providing for high frequency plunger movement, and in which a non-magnetic sleeve surrounding the plunger separates the backstops, providing a predetermined plunger stroke.

2. In a high speed impact solenoid, the combination of, a short low mass plunger having two ends, magnetic means affecting said plunger, said magnetic means including two coils arranged end to end surrounding the plunger, said coils having inner ends facing each other and outer ends facing away and arranged to allow longitudinal movement of the plunger, said magnetic means also including frame means of substantially uniform magnetic permeability supporting said coils, said frame means extending the length of both coils and having transverse end sections facing the outer ends of the coils, said magnetic means also including permeable magnetic flux transmitting means between the coils, said flux transmitting means extending from closely adjacent the plunger to said frame means and being substantially thicker than said transverse sections, high frequency switching means controlling said coils in a manner to move the plunger magnetically alternatively in opposite directions at high frequency, a plunger shaft attached to the plunger and mounted for axial movement inside the frame means, said shaft being substantially smaller in diameter than the plunger and transferring motion of the plunger to outside said frame means, said magnetic means including elongated backstops at each end of the plunger extending toward the plunger and providing an effective operating space for the short low mass plunger, the low mass of the plunger providing for high frequency plunger movement, and in which an antiresidual pad is located at one end of the plunger, said pad being formed of a thin non-magnetic material, approxiamtely 0.100" thickness and having the property of absorbing the impact of the plunger and starting it in the opposite direction.

3. The combination recited in claim 2 in which pads are located at both ends of the plunger.

4. In a solenoid, the combination of, a plunger having two ends, means including a cylindrical shell of magnetic material housing said plunger and supporting it for movement axially in said shell, first means in the shall including a first coil at one end of the plunger providing a magnetic flux circuit arranged to pull the plunger in the direction of said one end when the first coil is energized, second means in the shell including a second coil at the other end of the plunger providing a magnetic flux circuit arranged to pull the plunger in the direction of its other end when the second coil is energized, said first means in the shell also including transverse means of magnetic material carrying magnetic flux from the shell to its end of the plunger, the second means in the shell also including a second transverse means of magnetic material carrying magnetic flux from the shell to the other end of the plunger, said coils being spaced axially in said shell, said magnetic flux circuits including a separate flux washer of magnetic material in the space between the coils extending from the cylindrical shell to close proximity with the plunger, said flux washer having a thickness substantially greater than both of said transverse means, and high frequency switching means connected to said first coil and second coil and controlling said coils in a manner to drive the plunger magnetically alternately in opposite directions at high frequency, and in which each magnetic flux circuit includes an elongated backstop for the plunger extending inwardly through its coil to a point near the flux washer, and in which the plunger is surrounded by a non-magnetic sleeve providing a predetermined space between the backstops.

5. The combination recited in claim 4, further including circuit means for energizing the first and second coils in interleaved cyclic fashion by energizing one coil for a selected time less than required for the plunger to complete its movement, the plunger completing its movement by coasting, de-energizing both coils for a selected time, energizing the other coil for a selected time and de-energizing both coils for a selected time.

6. In a solenoid, the combination of, a plunger having two ends, means housing the plunger including a frame of magnetic material and a coil, said means also supporting the plunger for movement axially in said frame, a first backstop having an end, said end facing one end of the plunger, a second backstop having an end, said end facing the other end of the plunger, said backstops being attached to the frame and at least one of said backstops including magnetic material forming a magnetic flux circuit through the frame and plunger for causing movement of the plunger against said one backstop, and a non-magnetic sleeve surrounding the plunger and engaging both said ends of said backstops to space said backstops.

7. The combination recited in claim 6 in which one of the backstops is screw threaded into the frame so that it may be tightened against said sleeve.

8. The combination recited in claim 6 including an anti-residual pad between the plunger and said one backstop, said pad being formed of a thin non-magnetic material having the property of absorbing the impact of the plunger and starting it in the opposite direction.

9. The combination recited in any one of claims 6–8 in which the frame of magnetic material supports first and second axially located coils for the plunger, one coil when energized causing plunger movement in one direction and the other coil when energized causing plunger movement in the opposite direction, the combination further including circuit means for energizing the first and second coils in interleaved cyclic fashion by energizing one coil for a selected time, de-energizing both coils for a selected time, energizing the other coil for a selected time and de-energizing both coils for a selected time.

10. In a high speed impact solenoid, the combination of a plunger having two ends, means including a first magnetic flux circuit at one end of the plunger having a first coil and arranged to move the plunger in the direction of said one end when the first coil is energized; means including a second magnetic flux circuit at the other end of the plunger having a second coil and arranged to move the plunger in the direction of the other end when the second coil is energized, each magnetic flux circuit including a backstop for the plunger, high frequency switching means controlling said coils in a manner to drive the plunger magnetically alternately in opposite directions at high frequency, and an anti-residual pad between one backstop and the plunger, said pad being formed of a thin non-magnetic film approximately 0.010" thick having the property of absorbing the impact of the plunger and starting it in the opposite direction.

11. The combination recited in claim 10 including a second anti-residual pad between the other backstop and the plunger.

12. The combination recited in claim 10 in which the pad is formed of non-magnetic plastic film.

13. In a solenoid, the combination of a plunger having two ends, means housing the plunger including a frame of magnetic material and a coil, said means also supporting the plunger for movement axially in said frame, a first backstop for one end of the plunger, a second backstop for the other end of the plunger, said backstops being attached to said frame and at least one of said backstops including magnetic material forming a magnetic flux circuit through the frame and plunger for causing movement of the plunger against said one backstop, a plunger rod having a portion inside the plunger and extending to a point outside the solenoid, said rod being formed with a complete circumferential groove inside the plunger into which the plunger material is swaged.

14. The combination recited in claim 13 in which the plunger is formed with a circumferential groove extending inwardly from its circumference toward the rod adjacent the groove in the rod and the plunger material is swaged into the rod by applying pressure to the opposite ends of the plunger.

* * * * *